May 31, 1932.  L. H. BRINKMAN  1,860,989
DIE FOR CORRUGATED TUBES
Filed Aug. 19, 1927
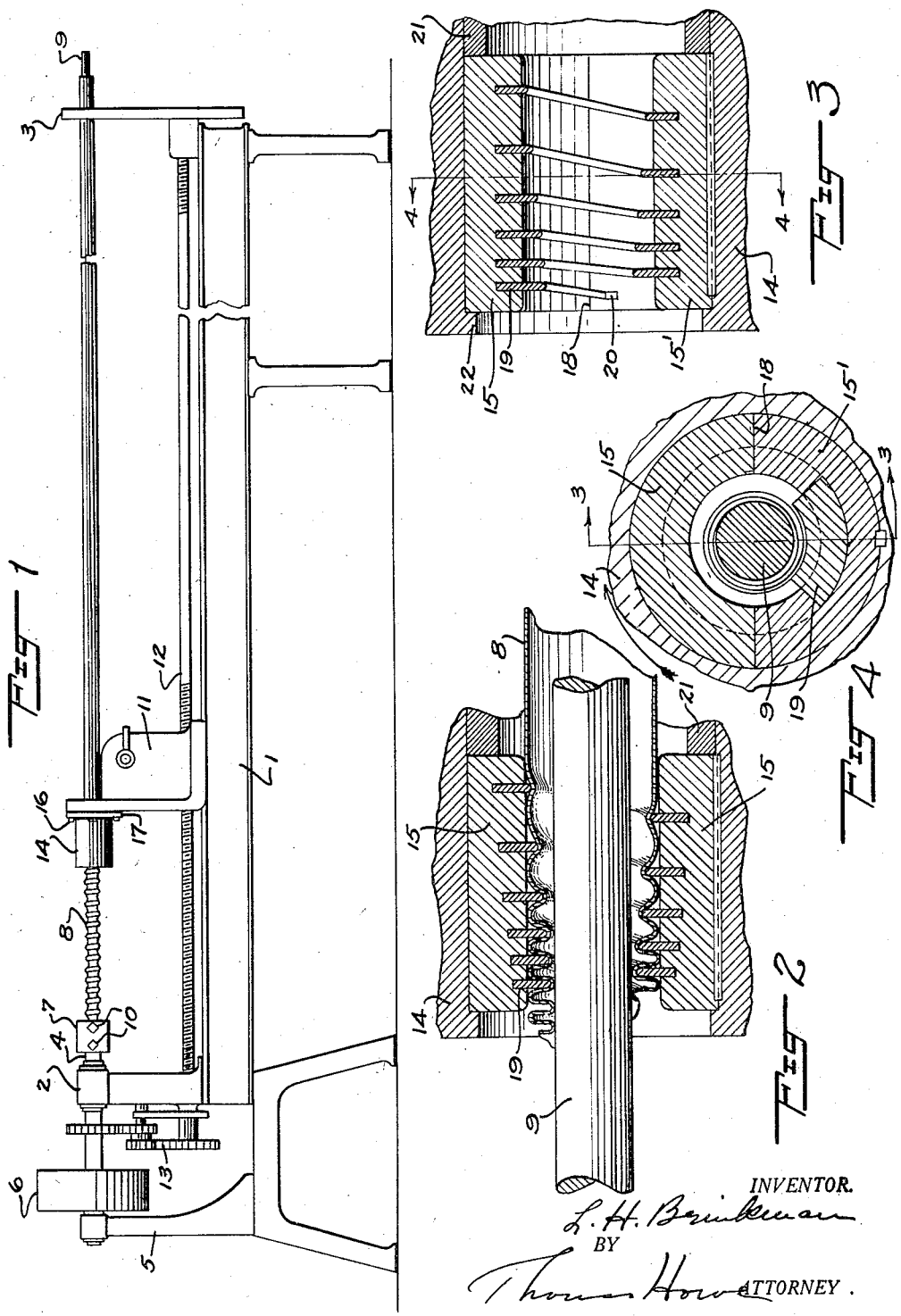
INVENTOR.
L. H. Brinkman
BY
Thomas Howe ATTORNEY.

Patented May 31, 1932

1,860,989

UNITED STATES PATENT OFFICE

LOUIS H. BRINKMAN, OF GLEN RIDGE, NEW JERSEY

DIE FOR CORRUGATED TUBES

Application filed August 19, 1927. Serial No. 214,006.

This invention relates to machines for producing corrugated tubes. It more particularly relates to the dies used in such machines.

It has for its object an improved construction of die which is adapted for use in a machine which produces helically corrugated tubes, such, for instance, as the machine of my prior Patents Nos. 1,120,267 and 1,120,269, patented December 8, 1914. The operation of the machine and the corresponding product obtained in the patent are substantially the equivalents of the operation and product of the present invention.

Other and more definite objects will be pointed out particularly in connection with the following specification, claims and drawings, in which,—

Fig. 1 is a side elevation of a machine including my improved die;

Fig. 2 is a longitudinal section of the die and with a tube therein, showing its action thereon, on an enlarged scale and partly broken away;

Fig. 3 is a cross-section of a modified form of the die on the line 3—3 of Fig. 4; and Fig. 4 is a section on the line 4—4 of Fig. 3, with the mandrel in place.

Referring to the drawings, a suitable machine frame 1 is arranged with a headstock 2 and a tail-rest 3. 4 is a shaft journaled in the headstock 2, and a counter-pillow block 5, driven through any suitable means, such as pulley 6. The inner end of the shaft is provided with a chuck 7 in which is secured the tube 8 to be corrugated. An inner support or mandrel 9 extends through the tube. The tube is secured to the chuck by any suitable means, such as set-screws 10, so that it will revolve with the chuck. A carriage 11, of suitable construction, is slidably mounted on the frame 1 and is moved longitudinally along the same by means of a feed screw 12 journaled in the head and tail stocks and driven from shaft 4 through suitable gearing 13, the gearing being arranged like the usual lathe gearing so that the speed of the screw spindle 12 may be varied, depending upon the work performed. On the carriage 11 is mounted a die comprising a suitable housing 14 in which a split sleeve 15 or 15' is mounted. The housing 14 is secured to the carriage 11 by means of bolts or other devices 16 extending through a flange 17. The sleeve 15 or 15' is made in two parts, being separable, as shown at 18 in Figs. 3 and 4. Within the inner surface of this support there is provided a groove on its inner surface for holding the active strip 19 of the die. This groove is cut within the surface in the form of a helix in which the pitch is continually decreasing from one end to the other. This variation in pitch aids in the slow-bending corrugation-forming action upon the tube from the time it enters until the time it leaves.

In addition to the change of pitch in the groove which holds the active element 19, there is a variation in the amount of projection of the element beyond the inner surface of the support so that the tube operated on is progressively bent inwardly until the desired position has been reached. This is shown more clearly in Figs. 2 and 3 and may be accomplished in several ways. One of these methods is shown in Fig. 2 where the active element 19 or strip is of uniform width, but the depth of the groove within the support is made to vary from one end to the other, while in Fig. 3 the depth of the groove is maintained throughout and the width of the strip 19 is varied. Either of these methods has proven to be effective for the purpose intended.

In order to prevent the sleeve pieces 15 and 15' from separating they are closely fitted within the housing 14 as indicated and may be held against rotation therein by means of a key, set-screws, or both, in a well-known manner. The manner of inserting the tube inside of the die is substantially the same as indicated in my prior patents, above referred to, it only being necessary to provide a tapered portion so that the tube may be readily inserted a substantial distance within the die. It will be seen that when pressure is applied to the tube and a rotative action given in the direction of the arrow as shown in Fig. 4, a force will be applied to the active element 19 in such a direction as to force it firmly against the bottom of its groove in the sleeve 15, tending to separate the sleeve halves and force them more tightly against the housing 14. The end 20 of this active element comes against a shoulder at the end of the groove and the rotation of the tube is such that its action on the element 19 will tend to force it against the shoulder. The element, therefore, will be securely held in position. A sleeve 21 inserted in the housing 14 prevents longitudinal displacement of the sleeve 15. The sleeve 15 is firmly clamped between shoulder 22 on the housing and the sleeve or ring 21 by the action of the bolts 16 in securing the housing onto the carriage 11.

The member 19 is a helically formed strip of steel bent edgewise and tempered very hard after formation as it is subjected to hard wear in the die, as will be apparent. This member 19 is assembled within the die by placing the two halves of the sleeve 15 about the helix, the edges of the helix fitting in the grooves in the sleeve, the sleeve 15 with the helix is inserted in the housing 14, the ring 21 put in place and the housing then bolted to the carriage 11 when the sleeve 15 and helix will be clamped in place as before referred to.

When the member 19 becomes worn, instead of the necessity of cutting a new die which is a very expensive operation, the die is disassembled, the sleeve 15 removed and its halves separated, the worn helix removed and a new one inserted. The sleeve 15 is then assembled with the machine as before described. It will be apparent that in the same manner working helixes differing in dimensions or form may readily be substituted for each other in the die.

It can thus be seen that a die constructed in the form indicated is so arranged that the active element may be readily replaced by a new element in a simple and efficient manner, and that this element is subjected to the greatest wear of any part of the machine inasmuch as it comes into direct frictional contact with the tube as it is being distorted. Inasmuch as the inside diameter of the sleeve is approximately the same size as the outside of the tube blank 8, little or no wearing action occurs on the surface. This permits the use of an extremely fine quality of steel to be used as the active element, after having given it proper heat treatment to produce the requisite hardness and wearing quality, while the sleeve 15 may be composed of a poorer quality of steel, but having the necesary toughness to withstand the shocks to which it is subjected, without cracking or other form of disruption. It is so associated with the active element as to support it more efficiently at the points at which such support is necessary. It can also be seen that the operation of the tube within the die tends to uncoil the active element 19 and force it into closer contact with the sleeve 15, the longitudinal thrust of the tube as it is being forced through the die being taken up by the shoulder 22 formed integral with the housing 14.

While the invention has been illustrated in what are considered its best applications, it may have other embodiments without departing from its spirit, and is not therefore limited to the structures shown in the drawings.

I claim:

1. A metal working machine for forming a flexible helically corrugated metal tube, including a die having a support piece with a helical recess formed therein, a replaceable active element positioned in the recess, and an abutment at the end of the recess against which the element is forced by the action of the machine.

2. A metal working machine having a hollow die and a mandrel passing therethrough, a helical groove arranged in said die, a metallic strip in said groove extending toward the mandrel and spaced therefrom, said strip projecting from the surface of said die by progressively increasing amounts, and said groove having a progressively decreasing pitch, said strip being abutted at one end whereby rotational friction of a tube against said strip will tend to tighten the assembled parts of said die.

3. A metal working machine having a hollow die and a mandrel passing therethrough, a helical groove arranged in said die, an integral metallic strip in said groove extending toward the mandrel and spaced therefrom, said strip projecting from the surface of said die by progressively increasing amounts and said groove having a progressively decreasing pitch and a progressively decreasing depth.

4. As the active element of a corrugating die, a metallic strip helically wound edgewise at a progressively decreasing pitch and diameter.

In testimony whereof I have signed this specification this 18th day of August 1927.

LOUIS H. BRINKMAN.